(12) United States Patent
Park et al.

(10) Patent No.: US 9,862,405 B2
(45) Date of Patent: Jan. 9, 2018

(54) AFS SYSTEM FOR VEHICLE

(71) Applicants: Hyundai Motor Company, Seoul (KR); Hyundai Mobis Co., Ltd., Seoul (KR)

(72) Inventors: Ki Sung Park, Whasung-Si (KR); Min Chul Shin, Whasung-Si (KR); Won Hyok Choi, Whasung-Si (KR); Hee Kyu Lim, Whasung-Si (KR); Tae Heon Lee, Whasung-Si (KR)

(73) Assignees: Hyundai Motor Company, Seoul (KR); Hyundai Mobis Co., Ltd., Seoul (KR)

( * ) Notice: Subject to any disclaimer, the term of this patent is extended or adjusted under 35 U.S.C. 154(b) by 108 days.

(21) Appl. No.: 14/937,660

(22) Filed: Nov. 10, 2015

(65) Prior Publication Data

US 2016/0272236 A1   Sep. 22, 2016

(30) Foreign Application Priority Data

Mar. 20, 2015 (KR) .................. 10-2015-0038582

(51) Int. Cl.
*B62D 5/00* (2006.01)
*F16H 57/08* (2006.01)
*F16H 1/28* (2006.01)

(52) U.S. Cl.
CPC .......... *B62D 5/008* (2013.01); *F16H 1/2863* (2013.01); *F16H 57/082* (2013.01)

(58) Field of Classification Search
CPC ...... B62D 5/008; F16H 1/2863; F16H 57/082
See application file for complete search history.

(56) References Cited

U.S. PATENT DOCUMENTS

| 5,631,511 A | * | 5/1997 | Schulmann | C30B 15/30 117/13 |
| 6,179,083 B1 | * | 1/2001 | Yamauchi | B62D 5/008 180/443 |
| 6,199,654 B1 | * | 3/2001 | Kojo | B62D 5/008 180/443 |
| 6,655,494 B2 | * | 12/2003 | Menjak | B62D 6/003 180/444 |

(Continued)

FOREIGN PATENT DOCUMENTS

| JP | 2003-312486 A | 11/2003 |
| JP | 2004-217046 A | 8/2004 |

(Continued)

*Primary Examiner* — Tony H Winner
*Assistant Examiner* — Michael R Stabley
(74) *Attorney, Agent, or Firm* — Morgan, Lewis & Bockius LLP

(57) ABSTRACT

An AFS system for a vehicle may include a motor which has a hollow motor shaft, an input shaft connected with a steering wheel and rotatably and penetratively inserted into the motor shaft, a planetary gear set including a sun gear formed at a lower end portion of the motor shaft, upper planet gears that engage with the sun gear, lower planet gears connected coaxially with the upper planet gears, a ring gear that engages with the lower planet gears, a carrier connected with a lower end portion of the input shaft so as to transmit power and connected to the lower planet gears so as to transmit power, and an output shaft formed integrally with the ring gear and extending toward a lower side of the ring gear.

18 Claims, 3 Drawing Sheets

(56) References Cited

U.S. PATENT DOCUMENTS

| | | | | |
|---|---|---|---|---|
| 6,997,076 B2* | 2/2006 | Menjak | ................. | B62D 1/105 |
| | | | | 74/409 |
| 7,063,636 B2* | 6/2006 | Augustine | ............... | B62D 5/008 |
| | | | | 180/446 |
| 7,306,535 B2* | 12/2007 | Menjak | ................. | B62D 5/008 |
| | | | | 180/444 |
| 7,377,875 B2* | 5/2008 | Shiina | ................... | B62D 5/008 |
| | | | | 475/331 |
| 7,568,989 B2* | 8/2009 | Naka | ...................... | B62D 5/008 |
| | | | | 475/28 |
| 7,665,572 B2* | 2/2010 | Yamanaka | ............ | B62D 5/008 |
| | | | | 180/402 |
| 7,878,294 B2* | 2/2011 | Morikawa | .............. | B62D 5/008 |
| | | | | 180/204 |
| 7,926,613 B2* | 4/2011 | Matsuda | ................ | B62D 5/008 |
| | | | | 180/443 |
| 8,775,025 B2* | 7/2014 | Yamaguchi | ........... | B62D 5/008 |
| | | | | 180/446 |

FOREIGN PATENT DOCUMENTS

| | | |
|---|---|---|
| JP | 2005-88833 A | 4/2005 |
| JP | 2007-145273 A | 6/2007 |
| JP | 2008-74368 A | 4/2008 |
| KR | 10-0600114 B1 | 7/2006 |
| KR | 10-2007-0022726 A | 2/2007 |
| KR | 10-2008-0045755 A | 5/2008 |
| KR | 10-0861871 B1 | 10/2008 |
| KR | 10-2014-0140851 A | 12/2014 |
| KR | 10-2015-0012827 A | 2/2015 |

* cited by examiner

→ : ELASTIC RESTORING FORCE

AFS SYSTEM FOR VEHICLE

CROSS-REFERENCE TO RELATED APPLICATION

The present application claims priority to Korean Patent Application No. 10-2015-0038582 filed Mar. 20, 2015, the entire contents of which is incorporated herein for all purposes by this reference.

BACKGROUND OF THE INVENTION

Field of the Invention

The present disclosure relates to an active front steering (AFS) system for a vehicle. More particularly, it relates to an AFS system for a vehicle, which is capable of easily compensating for a clearance between respective gear elements of a planetary gear set by newly improving a power transmission structure between a motor and the planetary gear set that constitute the AFS system.

Description of Related Art

An active front steering (hereinafter, referred to as AFS) system, which is applied to a steering system for a vehicle, is a system that changes a steering gear ratio for each vehicle speed, such as a high speed and a low speed, to stabilize behavior of the vehicle, and provides a fast steering gear ratio at a low speed, and a slow steering gear ratio at a high speed.

In other words, the AFS system provides a fast steering gear ratio when the vehicle travels at a low speed (e.g., when the vehicle is being parked) so that a steering operation is promptly and quickly carried out when a driver manipulates a steering wheel, and the AFS system provides a slow steering gear ratio when the vehicle travels at a medium or high speed so that the steering operation may be stably carried out by reducing steering sensitivity to the steering wheel.

To this end, the AFS system in the related art includes an input shaft which is connected with the steering wheel, a planetary gear set which reduces rotational force, which is transmitted from the input shaft, with a predetermined gear ratio, and a motor which is connected to one of gear elements of the planetary gear set by means of a worm and a worm wheel so that the motor may transmit power.

However, the AFS system in the related art requires components, such as the worm and the worm wheel, for transmitting power from the motor, in addition to essential components such as the planetary gear set and the motor, and as a result, there is a problem in that the structure of the AFS system is complicated, and the number of components is increased.

Meanwhile, there are clearances between the respective gear elements of the planetary gear set that is applied to the AFS system, for example, clearances between a sun gear and planet gears, and clearances between the planet gears and a ring gear, which causes vibration and noise.

Therefore, in order to reduce the clearances between the respective gear elements of the planetary gear set, a method of tightly maintaining, by using springs or the like, center distances between the respective gear elements, for example, center distances between the sun gear and the planet gears or between the planet gears and the ring gear is applied. However, there are problems in that even in a case in which shafts of the respective gear elements are slightly misaligned, engagement between teeth of the gear elements is broken, and the teeth of the respective gear elements do not properly mesh with each other, such that the teeth of the gear elements are caught.

Accordingly, there is a need for a new method of compensating for the clearances between the respective gear elements that constitute the AFS system, and there is also a need for a method of more simply transmitting power between the planetary gear set and the motor.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an AFS system for a vehicle, in which a hollow motor is applied as a motor that constitutes the AFS system, and a sun gear of a planetary gear set is formed directly on a motor shaft, such that a power transmission structure between the motor and the planetary gear set is newly improved, thereby reducing the number of components and manufacturing costs.

Additionally, various aspects of the present invention are directed to providing an AFS system for a vehicle, in which an elastic body is applied as a carrier of the planetary gear set, and respective shafts of the planet gears are bound by an elastic belt, thereby easily compensating for clearances between respective gear elements of the planetary gear set.

According to various aspects of the present invention, an AFS system for a vehicle may include a motor which has a hollow motor shaft, an input shaft connected with a steering wheel and rotatably and penetratively inserted into the motor shaft, a planetary gear set including a sun gear formed at a lower end portion of the motor shaft, upper planet gears that engage with the sun gear, lower planet gears connected coaxially with the upper planet gears, a ring gear that engages with the lower planet gears, a carrier connected with a lower end portion of the input shaft so as to transmit power and connected to the lower planet gears so as to transmit power, and an output shaft formed integrally with the ring gear and extending toward a lower side of the ring gear.

Male splines may be formed at the lower end portion of the input shaft so as to transmit power to the carrier.

The carrier may include a material having elastic force, and may further include a hollow body having female splines into which the male splines of the input shaft are inserted and fastened, elastic wings integrally extending outward from the hollow body while having a predetermined inclination, and providing elastic restoring force to compensate for clearances between the ring gear and the lower planet gears, and horizontal connecting plates formed integrally with outer ends of the elastic wings and connected coaxially with the lower planet gears.

An outer diameter of the carrier may be greater than an inner diameter of the ring gear, such that when the lower planet gears connected with the horizontal connecting plates of the carrier are inserted into and fastened to the ring gear, the elastic wings are configured to contract inward, and at the same time, provide elastic restoring force outward.

An elastic belt may be wound around respective rotating shafts, which protrude upward at centers of the upper planet gears, to compensate for clearances between the sun gear and the upper planet gears.

The elastic belt may include a rubber or plastic material having an annular structure with predetermined tension.

A groove may be formed in the motor shaft, and a solenoid, which is inserted into the groove so as to be locked, may be mounted in a motor housing.

Through the aforementioned technical solutions, the present invention provides the effects below.

First, the hollow motor is applied as a motor that constitutes the AFS system, the sun gear of the planetary gear set is formed directly on the motor shaft, and two-stage planet gears engage with the sun gear, such that a power transmission structure between the motor and the planetary gear set is newly improved, and components such as a worm and a worm wheel in the related art are eliminated, thereby reducing the number of components and manufacturing costs.

Second, it is possible to easily compensate for clearances between the sun gear and the upper planet gears, which constitute the planetary gear set, by using tension of the elastic belt that binds the respective shafts of the upper planet gears, and it is possible to easily compensate for clearances between the lower planet gears and the ring gear by using the carrier that is made of an elastic material and supports the lower planet gears by using elastic restoring force.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
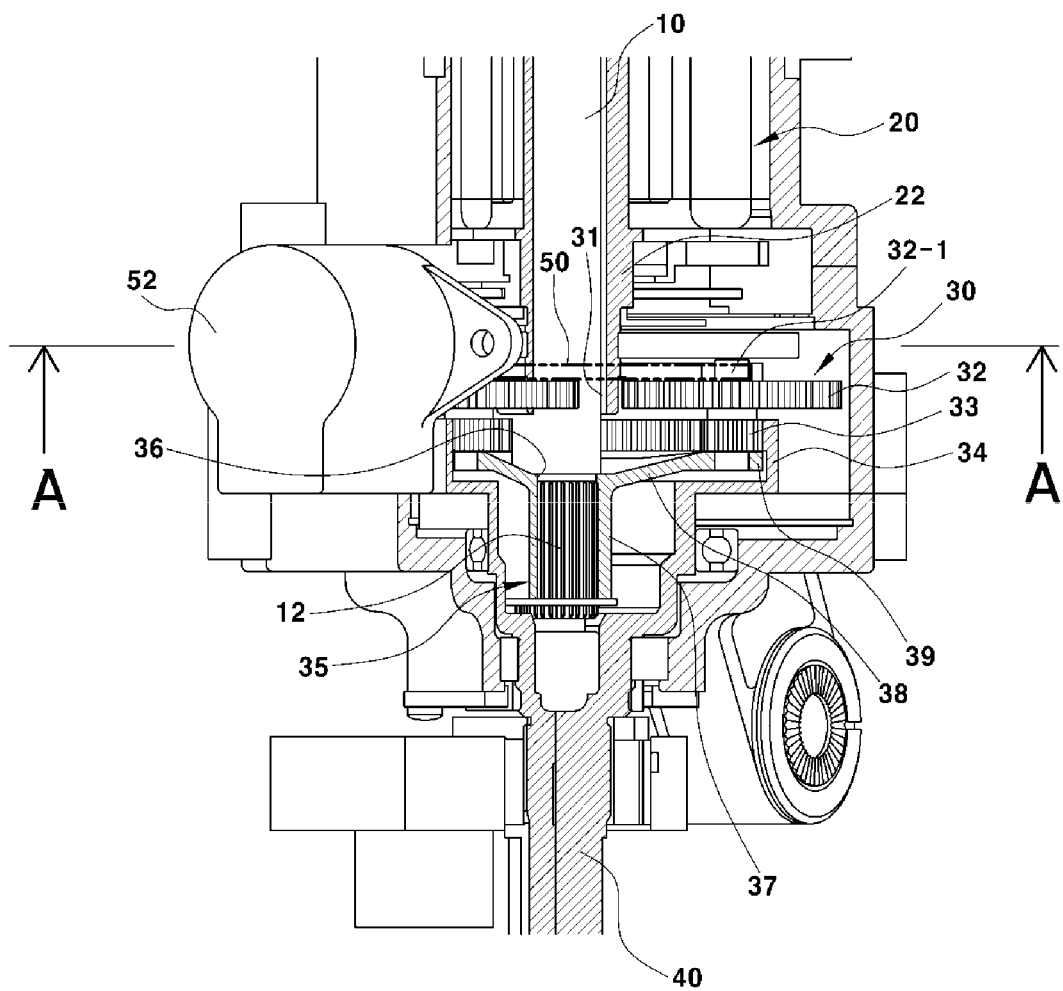
FIG. 1 is a partial cross-sectional perspective view illustrating an exemplary AFS system for a vehicle according to the present invention.
Figure 2:
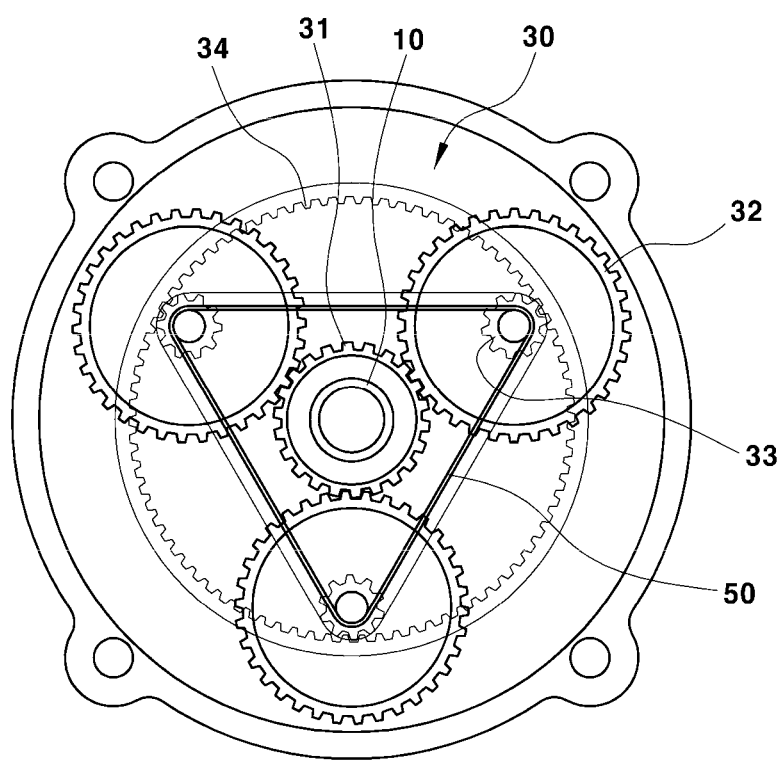
FIG. 2 is a cross-sectional view taken along line A-A of FIG. 1.

The attached FIG. 1 is a partial cross-sectional perspective view illustrating an AFS system for a vehicle according to the present invention, and FIG. 2 is a cross-sectional view taken along line A-A of FIG. 1.

In FIG. 1 and FIG. 2, reference numeral 10 indicates an input shaft that is connected with a steering wheel and inputs a steering angle.

A hollow motor, that is, a motor 20 having a hollow motor shaft 22 is disposed around a position of an outer diameter of the input shaft 10.

Therefore, the input shaft 10 connected with the steering wheel is rotatably inserted into the hollow motor shaft 22.

In this case, male splines 12 are formed at a lower end portion of the input shaft 10, and the male splines 12 are disposed below the motor shaft 22 as the input shaft 10 penetrates the motor shaft 22.

Here, a planetary gear set 30, which is connected with the input shaft 10 and the motor shaft 22 so as to be able to transmit power to the input shaft 10 and the motor shaft 22, is assembled at a position below the motor 20.

Among constituent elements of the planetary gear set 30, a sun gear 31 is formed integrally with an outer surface at a lower end of the motor shaft 22, and upper planet gears 32 mesh with the sun gear 31.

Lower planet gears 33 are disposed at bottom portions of the upper planet gears 32, and the lower planet gear 33 has a smaller size than the upper planet gear 32 and is connected coaxially with the upper planet gear 32.

A ring gear 34 engages with the lower planet gears 33, and an output shaft 40, which increases or decreases rotational force of the input shaft 10 through a gear ratio and outputs the rotational force of the input shaft 10, is formed integrally with a bottom portion of the ring gear 34 and extends.

In this case, a carrier 35 is fastened to the lower end portion of the input shaft 10 so as to be able to transmit power, and connected to the lower planet gears 33 so as to be able to transmit power.

To this end, the carrier 35 includes a hollow body 37 which has female splines 36 into which the male splines 12 of the input shaft 10 are inserted and fastened, elastic wings 38 which integrally extend outward from the hollow body 37 while having an upward inclination angle, and horizontal connecting plates 39 which are formed integrally with outer ends of the elastic wings 38 and connected coaxially with the lower planet gears 33.

As described above, the carrier 35 is manufactured by integrally forming the hollow body 37, the elastic wings 38, and the horizontal connecting plates 39, and may be made of a material having elastic force.

Therefore, the elastic wings 38, which extend from the hollow body 37, serve to provide elastic restoring force so as to compensate for clearances between the ring gear 34 and the lower planet gears 33, that is, clearances between the lower planet gears 33 and the ring gear 34 placed in a fixed state.

Figure 3:
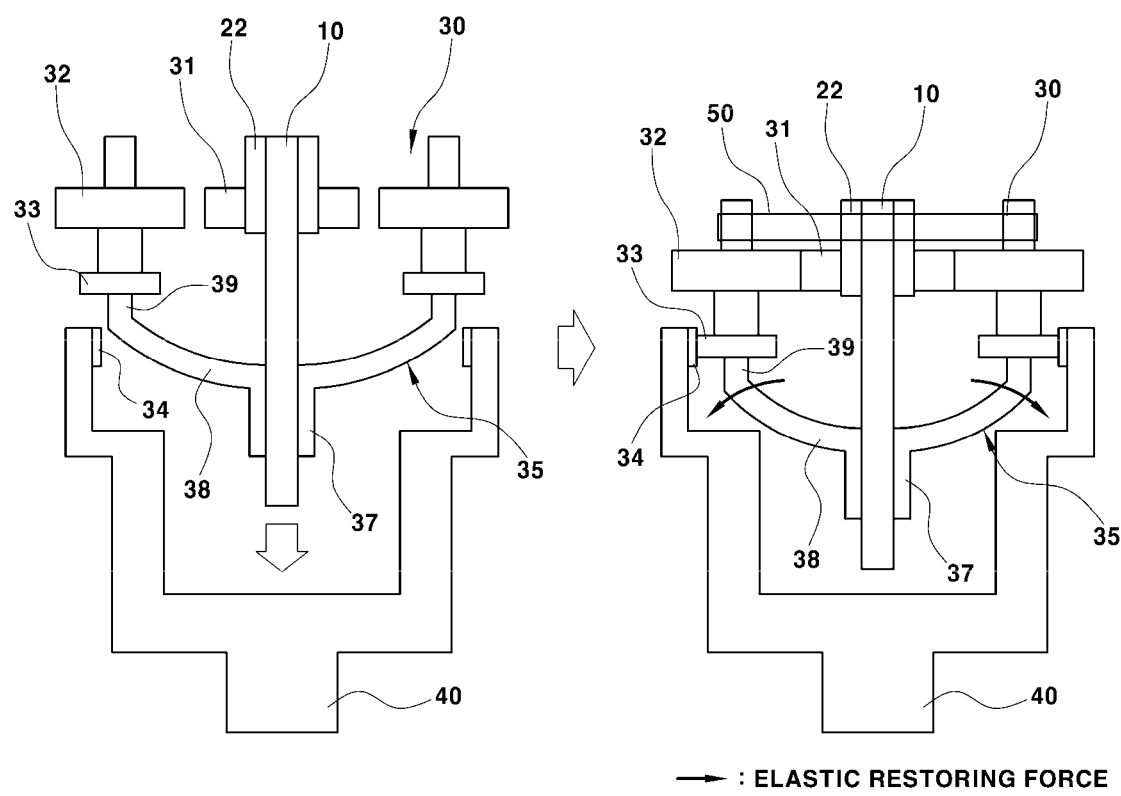
FIG. 3 is a schematic cross-sectional view illustrating a state in which a carrier made of an elastic material compensates for clearances between lower planet gears and a ring gear of a planetary gear set in a configuration of the exemplary AFS system for a vehicle according to the present invention.

In more detail, as can be clearly seen in the attached FIG. 3, an outer diameter of the carrier 35 is greater than an inner diameter of the ring gear 34, and as a result, at the moment when the lower planet gears 33 connected with the horizontal connecting plates 39 of the carrier 35 are fitted into the ring gear 34, the elastic wings 38 contract toward the inside where the input shaft 10 is present, and at the same time, provide elastic restoring force outward toward the ring gear 34.

Therefore, the lower planet gears 33 connected with the horizontal connecting plates 39 of the carrier 35 are easily and tightly attached to the ring gear 34 by elastic restoring force provided by the elastic wings 38 of the carrier 35, thereby compensating for the clearance, and easily preventing a clearance from being formed between the ring gear 34 and the lower planet gears 33.

In order to compensate for clearances between the sun gear 31 and the upper planet gears 32, that is, clearances between the upper planet gears 32 and the sun gear 31 placed in a fixed state, an elastic belt 50 is wound around respective central shafts 32-1 that protrude upward at centers of the upper planet gears 32.

In more detail, the elastic belt 50 is manufactured by using a rubber or plastic material to have an annular structure having predetermined tension, and wound around the respective central shafts 32-1 of the upper planet gears 32 while maintaining the predetermined tension.

Therefore, the tension of the elastic belt 50 acts as force to direct the upper planet gears 32 toward the motor shaft 22, and as a result, the upper planet gears 32 are easily and tightly attached to the sun gear 31, thereby compensating for the clearance, and easily preventing a clearance from being formed between the sun gear 31 and the upper planet gears 32.

Meanwhile, in order to restrict the rotation of the motor shaft 22 when the AFS system fails such as when control logic of the motor fails, a groove is formed in an outer portion of the motor shaft 22, and a solenoid 52, which is inserted into the groove of the motor shaft 22 so as to be able to be locked, is mounted in a motor housing.

Here, an operation flow of the AFS system for a vehicle of the present invention, which includes the aforementioned configurations, will be described below.

First, when the driver rotates the steering wheel to adjust the direction of the vehicle, the input shaft 10 connected with the steering wheel rotates, and at the same time, the carrier 35 spline-coupled to the input shaft 10 rotates in the same direction.

Consecutively, as the carrier 35 rotates, the lower planet gears 33 connected with the carrier 35 revolve around the sun gear 31, and at the same time, the upper planet gears 32, which are connected coaxially with the lower planet gears 33, rotate along the sun gear 31.

When the motor 20 is operated and the motor shaft 22 rotates, the sun gear 31 integrally coupled to the motor shaft 22 rotates, and rotational force of the sun gear 31 assists the rotation of the upper planet gears 32 and the revolution of the lower planet gears 33.

Therefore, the lower planet gears 33, which revolve around the sun gear 31, transmit rotational force to the ring gear 34, and at the same time, the output shaft 40 formed integrally with the ring gear 34 rotate to adjust the direction of the vehicle.

During the aforementioned operational process of the AFS system, a rotational speed of the motor 20 is controlled to become high when the vehicle travels at a low speed (e.g., when the vehicle is being parked) so as to allow the planetary gear set to provide a fast steering gear ratio, such that the steering operation may be promptly and quickly carried out. In contrast, a rotational speed of the motor 20 is controlled to become low when the vehicle travels at a medium or high speed so as to allow the planetary gear set to provide a low steering gear ratio, such that steering sensitivity is reduced, and a stable steering operation may be carried out.

Here, assuming that the number of teeth of the sun gear 31 is 22, the number of teeth of the upper planet gear 32 is 34, the number of teeth of the lower planet gear 33 is 10, and the number of teeth of the ring gear 34 is 66, a ratio of rotation of the output shaft with respect to one rotation of the steering wheel when the motor is locked, and a ratio of rotation of the output shaft with respect to one rotation of the motor will be described below.

Ratio of rotation of the output shaft with respect to one rotation of the steering wheel when the motor is locked A motor locked state is considered in order to find out a ratio of rotation of the output shaft with respect to one rotation of the steering wheel in a state in which the AFS system is excluded.

In order to restrict the rotation of the motor shaft 22 when the AFS system fails such as when control logic of the motor fails, the solenoid 52 is operated to restrict the groove formed in the outer portion of the motor shaft 22, such that the motor is placed in the motor locked state.

In this motor locked state, the sun gear 31 integrally coupled to the motor shaft 22 is fixed.

When the steering wheel makes one rotation in a state in which the sun gear 31 is fixed, the input shaft 10 also makes one rotation, and the carrier 35 spline-coupled to the input shaft 10 makes one rotation in the same direction.

Consecutively, the lower planet gears 33 connected with the carrier 35 revolve around the sun gear 31, and at the same time, the upper planet gears 32, which are connected coaxially with the lower planet gears 33, rotate along the sun gear 31 that is placed in the fixed state.

In this case, as the carrier 35 makes one rotation (360°), the lower planet gears 33 revolve around the sun gear by 360°.

At the same time, the upper planet gears 32, which are connected coaxially with the lower planet gears 33, rotate along the sun gear 31, and since the number of teeth of the sun gear 31 is 22, and the number of teeth of the upper planet gear 32 is 34, the rotation angle of the upper and lower planet gears 32 and 33 is [360×22/34=232.94°].

A rotation angle of the ring gear 34 is determined as a sum of a revolution angle of the lower planet gears 33 and a rotation angle of the upper and lower planet gears 32 and 33.

That is, since the number of teeth of the ring gear 34 is 66, and the number of teeth of the lower planet gear 32, which engages with the ring gear 34, is 10, a rotation angle of the ring gear according to the rotation angle of the upper and lower planet gears 32 and 33 is [232.94×10/66=35.29°], and when the revolution angle of 360° of the lower planet gear 33 is added to the rotation angle of the ring gear, the rotation angle of the ring gear 34 is 395.29°, and the rotation angle of the output shaft 40 formed integrally with the ring gear 34 is also 395.29°.

Therefore, since the rotation angle of the output shaft 40 with respect to one rotation (360°) of the steering wheel is 395.29° in the motor locked state, a ratio of rotation of the output shaft with respect to one rotation of the steering wheel is 1.098.

Ratio of rotation of the output shaft with respect to one rotation of the motor

A ratio of rotation of the output shaft with respect to one rotation of the motor is to find out a rotational ratio of the output shaft when only the motor is operated in a state in which the steering wheel is fixed in a neutral position (in a state in which the steering wheel is not rotated).

Since the steering wheel is placed in the fixed state, the input shaft 10 connected with the steering wheel and the carrier 35 connected with the input shaft 10 are also maintained in a fixed state.

In this state, when the motor shaft 22 makes one rotation as the motor 20 is operated, the sun gear 31 connected with the motor shaft 22 makes one rotation (360°) in the same direction.

Consecutively, as the sun gear 31 rotates, the upper planet gears 32, which engage with the sun gear 31, rotate in the opposite direction to the direction in which the motor shaft 22 rotates.

In this case, since the number of teeth of the sun gear 31 is 22, and the number of teeth of the upper planet gear 32, which engages with the sun gear 31, is 34, a rotation angle of the upper planet gear 32 is [360×22/34=232.94°].

Of course, the lower planet gear 33, which is connected coaxially with the upper planet gear 32, also has the same rotation angle.

The rotation angle of the ring gear 34 is determined by the rotation angle of the lower planet gear 33, and the ring gear 34 rotates in the opposite direction to the direction in which the motor shaft rotates.

That is, since the number of teeth of the ring gear 34 is 66, and the number of teeth of the lower planet gear 32, which engages with the ring gear 34, is 10, the rotation angle of the ring gear according to the rotation angle of the lower planet gear 33 is [232.94×10/66=35.29°].

Therefore, when the motor makes one rotation, the output shaft 40 formed integrally with the ring gear 34 has a rotational ratio of 1/10.2 (=35.29 degrees) in the opposite direction to the direction in which the motor rotates.

As described above, since rotational force of the steering wheel is reduced by the gear ratio of the motor and the planetary gear set and output to the output shaft, a fast steering gear ratio is provided when the vehicle travels at a low speed, and a slow steering gear ratio is provided when the vehicle travels at a medium or high speed, such that the operation of the AFS system may be smoothly carried out.

Accordingly, since the AFS system according to the present invention may be smoothly operated, it is possible to compensate for the clearances between the sun gear 31 and the upper planet gears 32 by using the elastic belt 50 as described above, and it is possible to compensate for the clearances between the lower planet gears 33 and the ring gear 34 by using the carrier 35 having elastic force, thereby providing the more stable AFS system.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An AFS system for a vehicle, comprising:
   a motor which has a hollow motor shaft;
   an input shaft connected with a steering wheel and rotatably and penetratively inserted into the motor shaft;
   a planetary gear set including a sun gear formed at a lower end portion of the motor shaft, upper planet gears that engage with the sun gear, lower planet gears connected coaxially with the upper planet gears, a ring gear that engages with the lower planet gears, a carrier connected with a lower end portion of the input shaft so as to transmit power and connected to the lower planet gears so as to transmit power; and
   an output shaft formed integrally with the ring gear and extending toward a lower side of the ring gear,
   wherein male splines are formed at the lower end portion of the input shaft so as to transmit power to the carrier.

2. The AFS system of claim 1, wherein the carrier comprises a material having elastic force, and includes:
   a hollow body having female splines into which the male splines of the input shaft are inserted and fastened;
   elastic wings integrally extending outward from the hollow body while having a predetermined inclination, and providing elastic restoring force to compensate for clearances between the ring gear and the lower planet gears; and
   horizontal connecting plates formed integrally with outer ends of the elastic wings and connected coaxially with the lower planet gears.

3. The AFS system of claim 2, wherein an outer diameter of the carrier is greater than an inner diameter of the ring gear, such that when the lower planet gears connected with the horizontal connecting plates of the carrier are inserted into and fastened to the ring gear, the elastic wings are configured to contract inward, and at the same time, provide elastic restoring force outward.

4. The AFS system of claim 1, wherein an elastic belt is wound around respective rotating shafts, which protrude upward at centers of the upper planet gears, to compensate for clearances between the sun gear and the upper planet gears.

5. The AFS system of claim 4, wherein the elastic belt comprises a rubber or plastic material having an annular structure with predetermined tension.

6. The AFS system of claim 1, wherein a groove is formed in the motor shaft, and a solenoid, which is inserted into the groove so as to be locked, is mounted in a motor housing.

7. An AFS system for a vehicle, comprising:
   a motor which has a hollow motor shaft;
   an input shaft connected with a steering wheel and rotatably and penetratively inserted into the motor shaft;
   a planetary gear set including a sun gear formed at a lower end portion of the motor shaft, upper planet gears that engage with the sun gear, lower planet gears connected coaxially with the upper planet gears, a ring gear that engages with the lower planet gears, a carrier connected with a lower end portion of the input shaft so as to transmit power and connected to the lower planet gears so as to transmit power; and
   an output shaft formed integrally with the ring gear and extending toward a lower side of the ring gear, wherein the carrier comprises a material having elastic force, and includes:
a hollow body having female splines into which the male splines of the input shaft are inserted and fastened;
elastic wings integrally extending outward from the hollow body while having a predetermined inclination, and providing elastic restoring force to compensate for clearances between the ring gear and the lower planet gears; and
horizontal connecting plates formed integrally with outer ends of the elastic wings and connected coaxially with the lower planet gears.

8. The AFS system of claim 7, wherein male splines are formed at the lower end portion of the input shaft so as to transmit power to the carrier.

9. The AFS system of claim 7, wherein an outer diameter of the carrier is greater than an inner diameter of the ring gear, such that when the lower planet gears connected with the horizontal connecting plates of the carrier are inserted into and fastened to the ring gear, the elastic wings are configured to contract inward, and at the same time, provide elastic restoring force outward.

10. The AFS system of claim 7, wherein an elastic belt is wound around respective rotating shafts, which protrude upward at centers of the upper planet gears, to compensate for clearances between the sun gear and the upper planet gears.

11. The AFS system of claim 10, wherein the elastic belt comprises a rubber or plastic material having an annular structure with predetermined tension.

12. The AFS system of claim 7, wherein a groove is formed in the motor shaft, and a solenoid, which is inserted into the groove so as to be locked, is mounted in a motor housing.

13. An AFS system for a vehicle, comprising:
a motor which has a hollow motor shaft;
an input shaft connected with a steering wheel and rotatably and penetratively inserted into the motor shaft;
a planetary gear set including a sun gear formed at a lower end portion of the motor shaft, upper planet gears that engage with the sun gear, lower planet gears connected coaxially with the upper planet gears, a ring gear that engages with the lower planet gears, a carrier connected with a lower end portion of the input shaft so as to transmit power and connected to the lower planet gears so as to transmit power; and
an output shaft formed integrally with the ring gear and extending toward a lower side of the ring gear,
wherein a groove is formed in the motor shaft, and a solenoid, which is inserted into the groove so as to be locked, is mounted in a motor housing.

14. The AFS system of claim 13, wherein male splines are formed at the lower end portion of the input shaft so as to transmit power to the carrier.

15. The AFS system of claim 13, wherein the carrier comprises a material having elastic force, and includes:
a hollow body having female splines into which the male splines of the input shaft are inserted and fastened;
elastic wings integrally extending outward from the hollow body while having a predetermined inclination, and providing elastic restoring force to compensate for clearances between the ring gear and the lower planet gears; and
horizontal connecting plates formed integrally with outer ends of the elastic wings and connected coaxially with the lower planet gears.

16. The AFS system of claim 15, wherein an outer diameter of the carrier is greater than an inner diameter of the ring gear, such that when the lower planet gears connected with the horizontal connecting plates of the carrier are inserted into and fastened to the ring gear, the elastic wings are configured to contract inward, and at the same time, provide elastic restoring force outward.

17. The AFS system of claim 13, wherein an elastic belt is wound around respective rotating shafts, which protrude upward at centers of the upper planet gears, to compensate for clearances between the sun gear and the upper planet gears.

18. The AFS system of claim 17, wherein the elastic belt comprises a rubber or plastic material having an annular structure with predetermined tension.

* * * * *